United States Patent
Workman et al.

(10) Patent No.: US 6,758,244 B2
(45) Date of Patent: Jul. 6, 2004

(54) THRUST PLUG AND METHOD FOR USING A THRUST PLUG

(75) Inventors: Larry Workman, Jackson, TN (US); Donald J. Klein, Jackson, TN (US)

(73) Assignee: Lasco Fittings, Inc., Brownsville, TN (US)

( * ) Notice: Subject to any disclaimer, the term of this patent is extended or adjusted under 35 U.S.C. 154(b) by 0 days.

(21) Appl. No.: 10/213,358

(22) Filed: Aug. 6, 2002

(65) Prior Publication Data

US 2004/0035483 A1 Feb. 26, 2004

(51) Int. Cl.[7] .................................................. F16L 55/10
(52) U.S. Cl. ........................ 138/89; 138/96 R; 220/796
(58) Field of Search ........................... 138/96 R, 96 T, 138/89; 220/796

(56) References Cited

U.S. PATENT DOCUMENTS

| | | | | |
|---|---|---|---|---|
| 1,674,998 A | * | 6/1928 | Spang .................... 138/96 T |
| 2,238,643 A | * | 4/1941 | Hicks ..................... 138/96 R |
| 2,737,205 A | * | 3/1956 | Stringfield ................ 138/89 |
| 3,065,767 A | * | 11/1962 | Topf ........................ 138/89 |
| 3,104,681 A | * | 9/1963 | Gray, Jr. .................. 138/96 R |
| 3,574,312 A | * | 4/1971 | Miller ..................... 138/96 R |
| 3,675,685 A | * | 7/1972 | Potter ...................... 138/89 |
| 3,996,966 A | * | 12/1976 | Princell .................... 138/89 |
| 4,046,168 A | * | 9/1977 | Milne ...................... 138/89 |
| 4,239,062 A | * | 12/1980 | Callicoatte ............... 138/96 R |
| 5,224,515 A | * | 7/1993 | Foster et al. ............... 138/89 |
| 5,503,189 A | * | 4/1996 | Lamendola .............. 138/96 R |
| 6,196,270 B1 | * | 3/2001 | Richards et al. .......... 138/96 T |
| 6,290,092 B1 | * | 9/2001 | Cote et al. ................ 220/796 |

* cited by examiner

Primary Examiner—Patrick Brinson
(74) Attorney, Agent, or Firm—Calfee Halter & Griswold LLP

(57) ABSTRACT

A thrust plug that performs the functions of both (i) reversibly capping an end of a length of pipe, a fitting, or the like and (ii) providing a surface against which a concrete thrust block can be cast, thereby facilitating thrust blocking. The thrust plug of the present invention comprises a plug affixed to a base for engagement with a thrust block and against which a concrete thrust block can be directly cast.

5 Claims, 11 Drawing Sheets

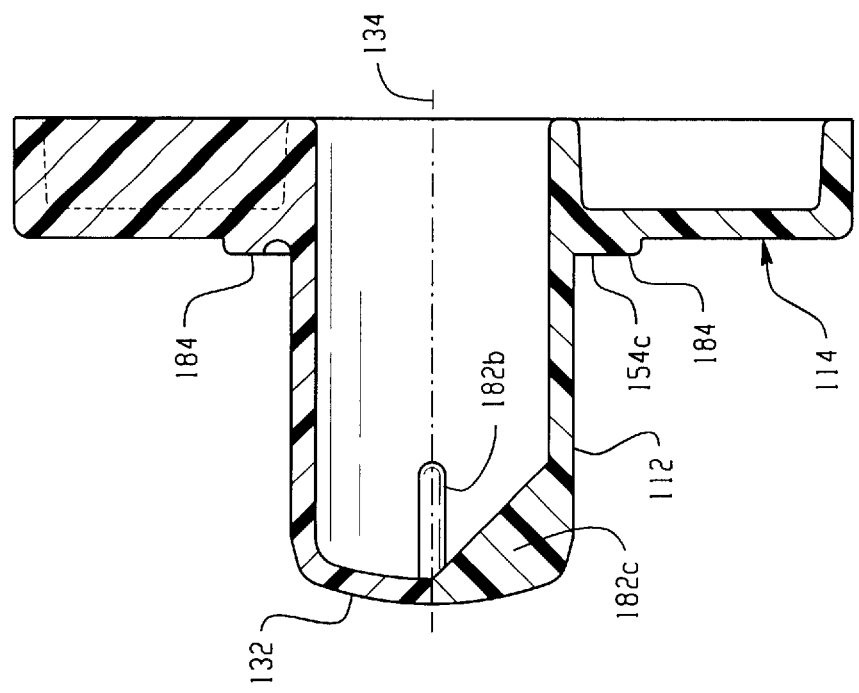
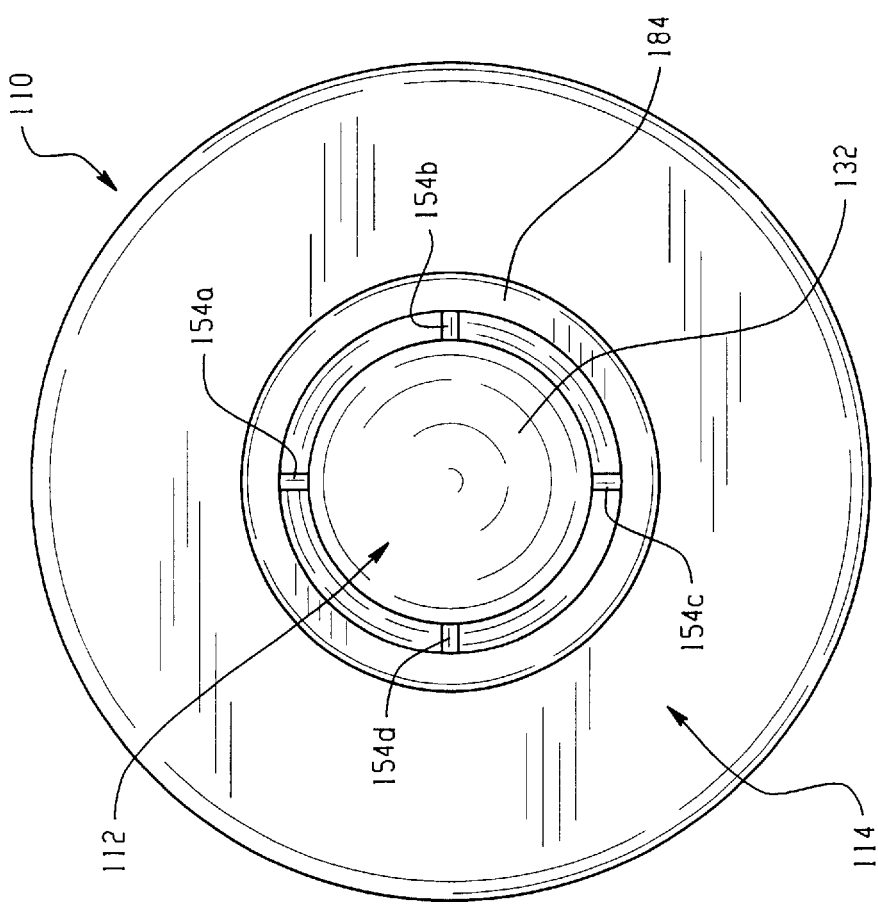
Fig. 3C
Fig. 3A

SECTION B-B

SECTION C-C

SECTION B-B

SECTION C-C

SECTION B-B

SECTION C-C

SECTION B-B

SECTION C-C

THRUST PLUG AND METHOD FOR USING A THRUST PLUG

FIELD OF THE INVENTION

The present invention relates generally to the field of irrigation, and more specifically to a thrust plug that performs two functions, namely (i) plugging an opening in a fluid delivery system (e.g., an open orifice of a fitting or coupling) and (ii) providing a surface against which a concrete thrust block can be cast. The thrust plug of the present invention preferably reversibly plugs the opening in the fluid delivery system.

BACKGROUND OF THE INVENTION

Thrust blocking is well known in the art of gasketed o-ring connection irrigation systems, e.g., municipal water systems and golf course irrigation systems. It is well known that water under pressure can exert thrust forces in piping systems, especially as the system is activated and pressurized. In a typical four-inch PVC 150 p.s.i. system, peak pressures of about 200 p.s.i. are not uncommon, which can generate thrust forces of about 13,000 pounds. To counteract these thrust forces, concrete thrust blocks are typically cast in place at each change in direction or increase in pressure of a pipe line, including but not limited to at all reducers, tees, crosses, plugs, end caps, elbows (of various degrees), tees used as elbows, crosses used as elbows, Y-connections, valve anchors, etc. These concrete thrust blocks are typically cast between undisturbed earth and one of the fittings listed above.

Thrust blocking is especially important for gasket and o-ring systems in which the only restraining forces which are available to counteract thrust forces are forces provided by friction and burial. Neither of these forces is capable of counter balancing the force created by the internal hydraulic pressure of the system. Paragraph 6.1 of ANSI/ASTM F690, "Practice for Underground Installation of Thermoplastic Pressure Piping Irrigation Systems," states "When installing piping systems that include joints that are self restraining (for example, elastomeric seal type) thrust blocking may be necessary at certain points in the system, such as changes in direction, in order to prevent possible disengagement of the fitting from the pipe."

SUMMARY OF THE INVENTION

The present invention is directed toward a thrust plug that performs the functions of both capping or plugging an end of a length of pipe and providing a surface against which a thrust block can be cast. In a broad sense, the thrust plug of the present invention comprises a plug affixed to a base for engagement with a thrust block and against which a thrust block can be directly cast. The thrust plug of the present invention preferably reversibly caps or plugs the length of pipe.

Additionally, the thrust plug can have optional structures such as one or more stabilizing structures that add positional stability to the thrust plug relative to a thrust block, such as one or more of the following: an outer flange extending from at least a portion of the periphery of the base 14 toward the thrust block, other flanges, an extension of the plug 12 extending toward the thrust block, gussets, standoffs, etc. The plug preferably has a portion that is like a length of pipe, i.e., cylindrical. In the alternative, or in addition, the plug can have a portion that is tapered (e.g., frustoconical or like an end of a hand-dipped candle or like the tip of a classically drawn tear drop), and most-preferably slightly tapered.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein:

FIG. 3A is a front elevational view of a thrust plug according to a second embodiment of the present invention;

FIG. 3C is a sectional view of the thrust plug shown in FIG. 3B taken along the section line A—A in FIG. 3B;

DETAILED DESCRIPTION OF THE INVENTION

Figure 1B:
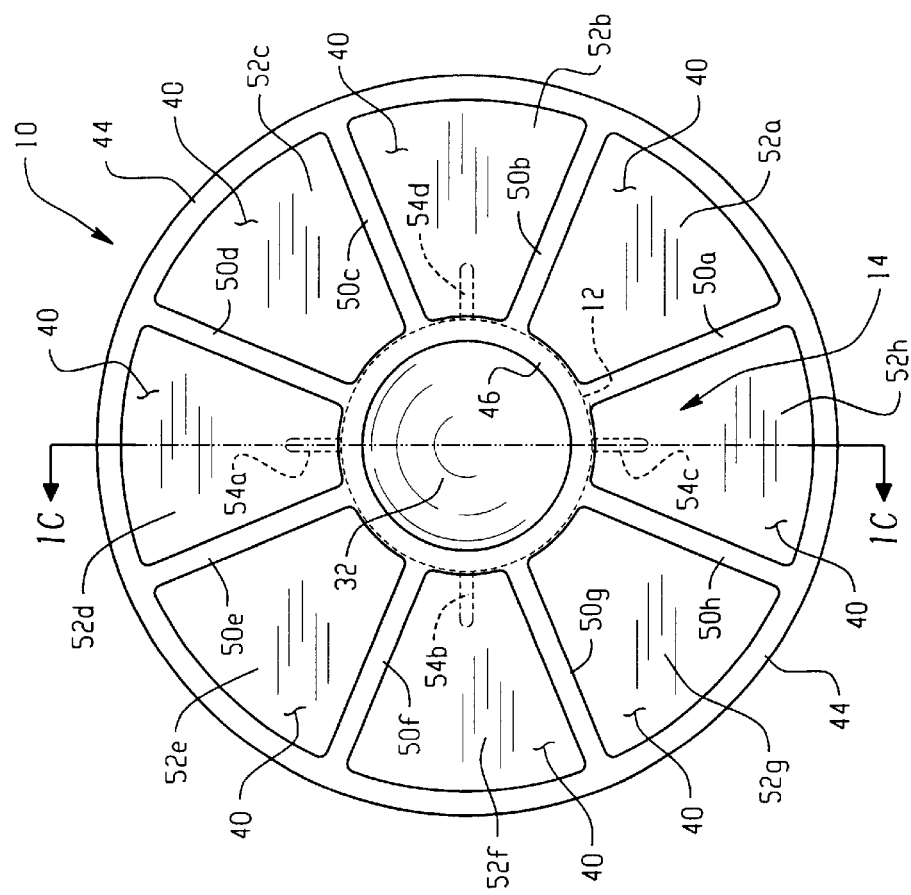
FIG. 1B is a rear elevational view of the thrust plug of FIG. 1A.
Figure 1A:
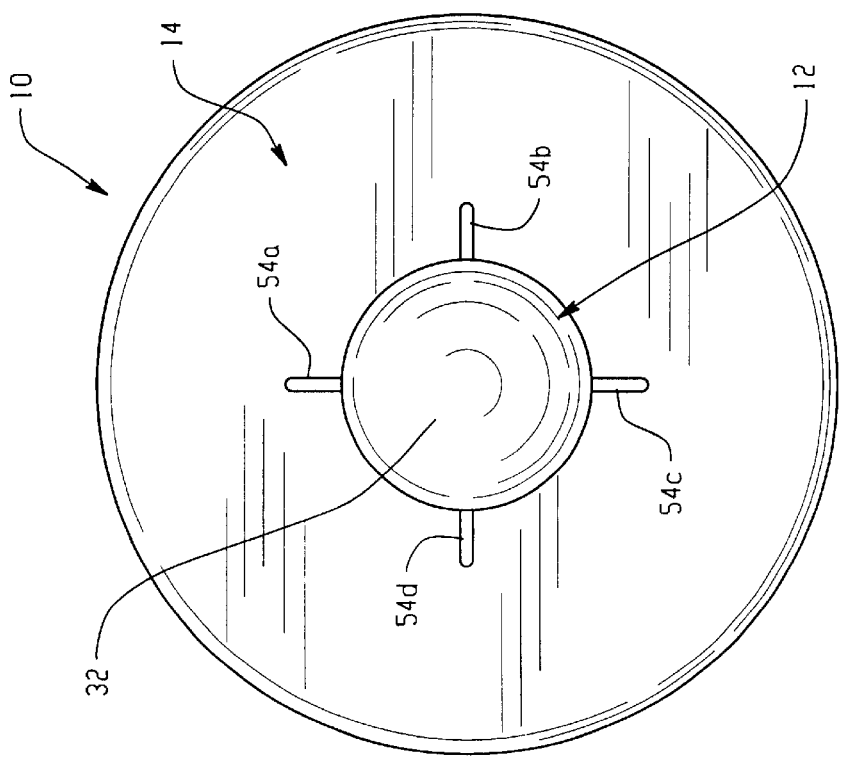
FIG. 1A is a front elevational view of a thrust plug according to a first embodiment of the present invention.
Figure 1C:
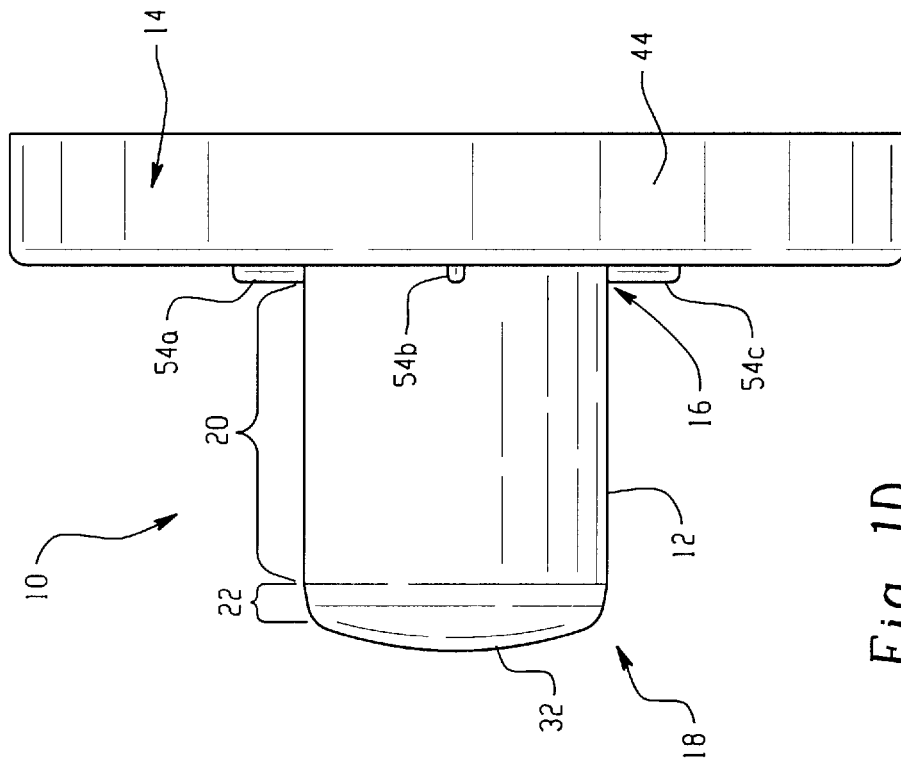
FIG. 1C is a sectional view of the thrust plug shown in FIG. 1B taken along the section line 1C—1C in FIG. 1B.
Figure 1D:
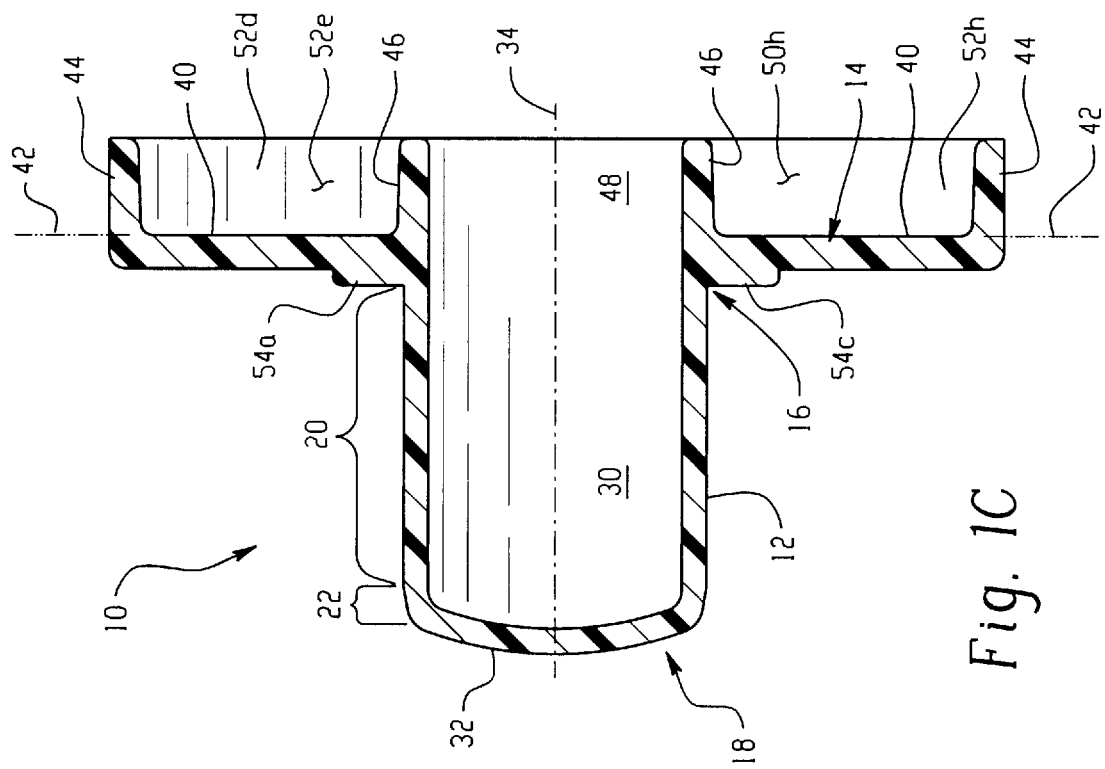
FIG. 1D is a right side elevational view of the thrust plug shown in FIG. 1A, for which the left side elevational view, the top plan view, and the bottom plan view (all not shown) would all be the same (except for the reference characters 54a–54c).

The present invention provides a thrust plug that performs the functions of both (i) capping a fitting or an end of a length of pipe or the like and (ii) providing a surface against which a thrust block can be cast. In a broad sense, the thrust plug according to the present invention comprises a structure to cap the end of a fitting, etc., with the plug being affixed to a base, i.e., a piece of material providing a surface against which a thrust block can be cast. The thrust plug of the present invention preferably ("preferably" as used throughout this disclosure means "preferably but not necessarily") reversibly caps the fitting or pipe end, so that the thrust plug can be removed and the fluid system can be continued past the location that was previously capped by and thrust blocked against the thrust plug. The term "base" as used herein can be, but need not be, a flat, thin, solid, smooth, planar member of substantially uniform thickness. The term "base" as used herein can refer to structures that are not flat, or thin, or smooth, or planar, or of uniform thickness, or solid. To the contrary, the base of the thrust plug of the present invention is a piece of material that extends from the plug that provides a surface against which a concrete thrust block could be cast to thrust block the plug. A sphere (solid or hollow) affixed to the back end of a plug could be a base, as could a cone (solid or hollow, oriented in virtually any direction). Similarly, the base according to the present invention can have virtually any texture thereon or therein, e.g., macro textures (e.g., corrugation of the structure or rippling of the surface) or smaller surface-type textures.

With reference now to the drawings and initially to FIGS. 1A–1D, there is shown a first embodiment 10 of a thrust plug according to the present invention. Thrust plug 10 shown in FIGS. 1A–1D comprises a plug 12 affixed to, and preferably integrally formed with, a base 14. Plug 12 has two ends: a first end 16 that extends outwardly from base 14 and a second, opposite, end 18 that extends into the fitting or pipe or whatever else is being plugged by thrust plug 10.

Plug 12 comprises a first portion 20 that preferably extends from its first end 16 toward its second end 18 and that preferably engages the inside of whatever fitting or pipe or whatever is being plugged by thrust plug 10. First portion 20 of plug 12 is preferably cylindrical. This first portion 20 of plug 12 preferably transitions to a second, preferably frustoconical, portion 22, that tapers toward the second end 18 of plug 12 at an angle of about 15°. This second portion 22 permits the plug 12 of thrust plug 10 to be more easily inserted into the fitting or pipe. The first portion 20 and the second portion 22 are preferably hollow defining a volume 30. At some point along its length, plug 12 is capped so as to perform the function of stopping the flow of fluid through the fitting or pipe or whatever is being plugged by thrust plug 10. In the embodiment shown in FIGS. 1A–1D, the plug 10 has a cap 32 at its second end 18 joined with and sealing second portion 22. In the alternative, cap 32 can be positioned at other locations, e.g., at another location inside the volume 30. Cap 32 is preferably substantially spherical, i.e., having an outer surface like the outer surface of a section of a sphere. First portion 20 of plug 12 preferably has a central axis 34 associated therewith, which may be the longitudinal axis of the plug 12.

Base 14 is a structure against which a thrust block can be cast. It preferably has an outer periphery (when viewed along axis 34) that extends beyond the outer periphery of the plug 12. This is to provide additional cross-sectional area (when viewed along axis 34) for engagement with the thrust block in addition to the cross-sectional area (when viewed along axis 34) of the plug 12. Base 14 preferably has a planar portion 40 lying on an imaginary plane 42 that is preferably perpendicular (or substantially perpendicular) to the central axis 34 of the first portion 20 of plug 12. Base 14 preferably includes one or more additional structures that provide additional strength to the base and/or that provide additional resistance to movement of the base 14 (and hence of the thrust plug 10) relative to a thrust block. These additional structures can include any one or more of the following: an outer flange extending from at least a portion of the periphery of base 14 extending toward the thrust block, other flanges extending from other parts of base 14 extending toward the thrust block, an extension of the plug 12 extending toward the thrust block, gussets extending toward the thrust block, other gussets, standoffs, etc. For example, in the embodiment of the thrust plug 10 shown in FIGS. 1A–1D and 2, planar portion 40 is shown as being substantially planar and circular and having an outer flange extending from the periphery of the circular planar portion 40 substantially perpendicular to the plane 42, thereby forming a ring 44 around the periphery of planar portion 40. As another example of additional optional structures, in the embodiment of the thrust plug 10 shown in FIGS. 1A–1D and 2, there is a central ring 46 formed as an extension of first portion 20 of plug 12. Central ring 46 is shown defining another volume 48. As yet another example of additional optional structures, in the embodiment of the thrust plug 10 shown in FIGS. 1A–1D and 2, a plurality of gussets 50a–50h are shown extending between the outer ring 44 and the central ring 46, and also connected to the planar portion 40, that provide additional structural support for those components. These gussets 50a–50h also define a plurality of volumes 52a–52h that accept concrete to provide positional support for the thrust plug 10 relative to a thrust block (see FIG. 2). As still another example of additional optional structures, in the embodiment of the thrust plug 10 shown in FIGS. 1A–1D and 2, a plurality of standoffs 54a–54d are shown as squat gussets extending between the plug 12 and the plug side of base 14. These standoffs are raised bearing surfaces to relieve strain at the mating part at section 40, when water pressure is applied.

The thrust plug 10 is preferably injection molded from a polymer material, such as acrylonitrile butadiene styrene (ABS), poly vinyl chloride (PVC), chlorinated PVC (CPVC), poly propylene (PP), and poly ethylene (PE), or any other suitable material. All the components of the thrust plugs of the present invention, e.g., the plug and the base and any optional additional structures, are preferably formed integrally together during the molding process in a single mold. In the alternative, individual pieces can be affixed after molding, e.g., affixed with welding or adhesive or ultrasonic welding or the like. The external surface of plug 12, or at least the part of portion 20 thereof that contacts the gasket, should be smooth and have no parting line on that surface to provide a good seal for the plug 12. During the molding process, extracting the mold core from the volumes 30 and 48 (FIG. 1C) will create negative pressure and may cause the section 20 to sink or collapse, which may affect the ability of the rubber seal in the mating fitting to hold adequate water pressure. Accordingly, a vacuum relief mechanism will be required in the tool design.

Figure 2:
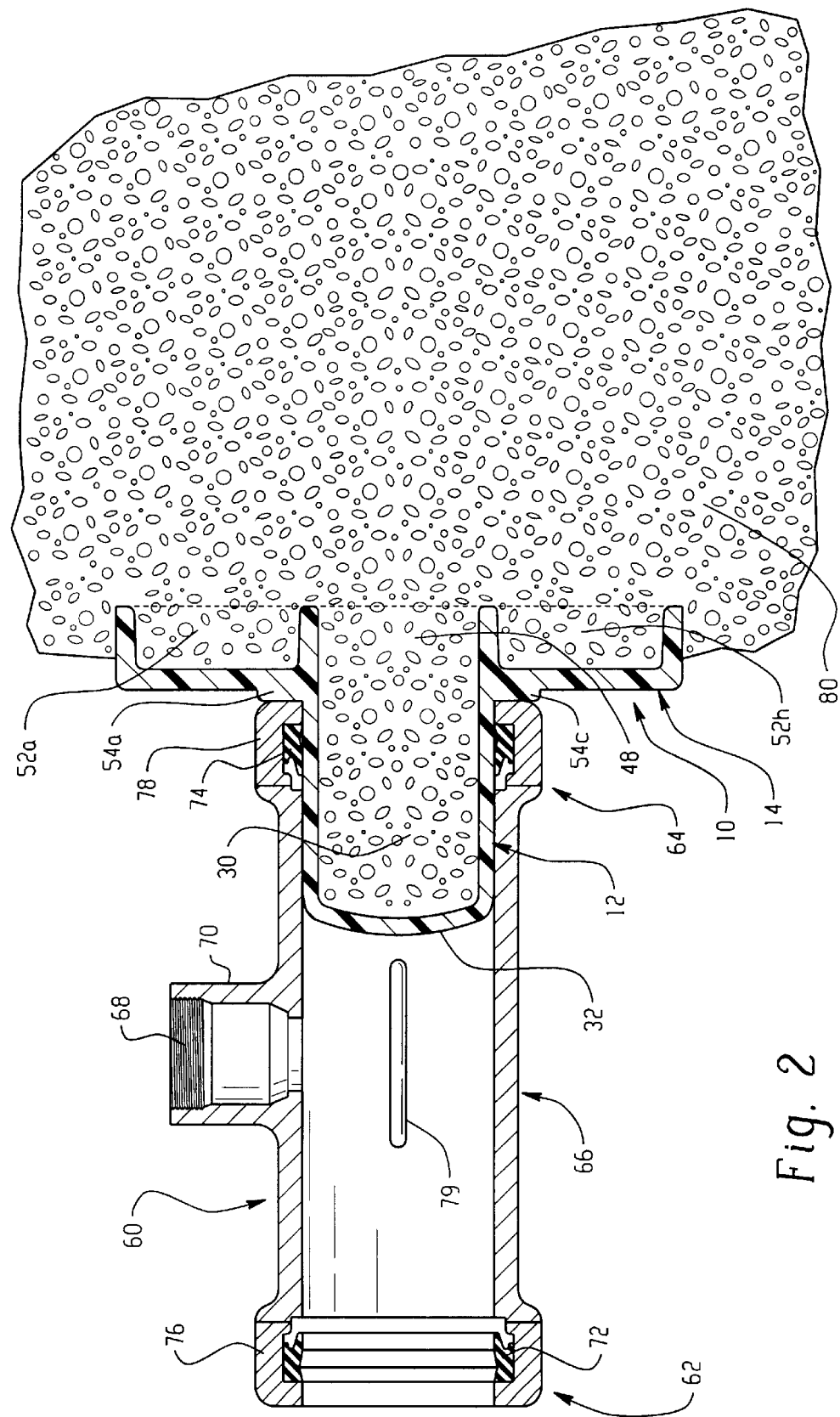
FIG. 2 is a sectional view showing the thrust plug of FIG. 1C used with a tapped coupling and a portion of a concrete thrust block, all of which are shown in section.
Figure 3B:
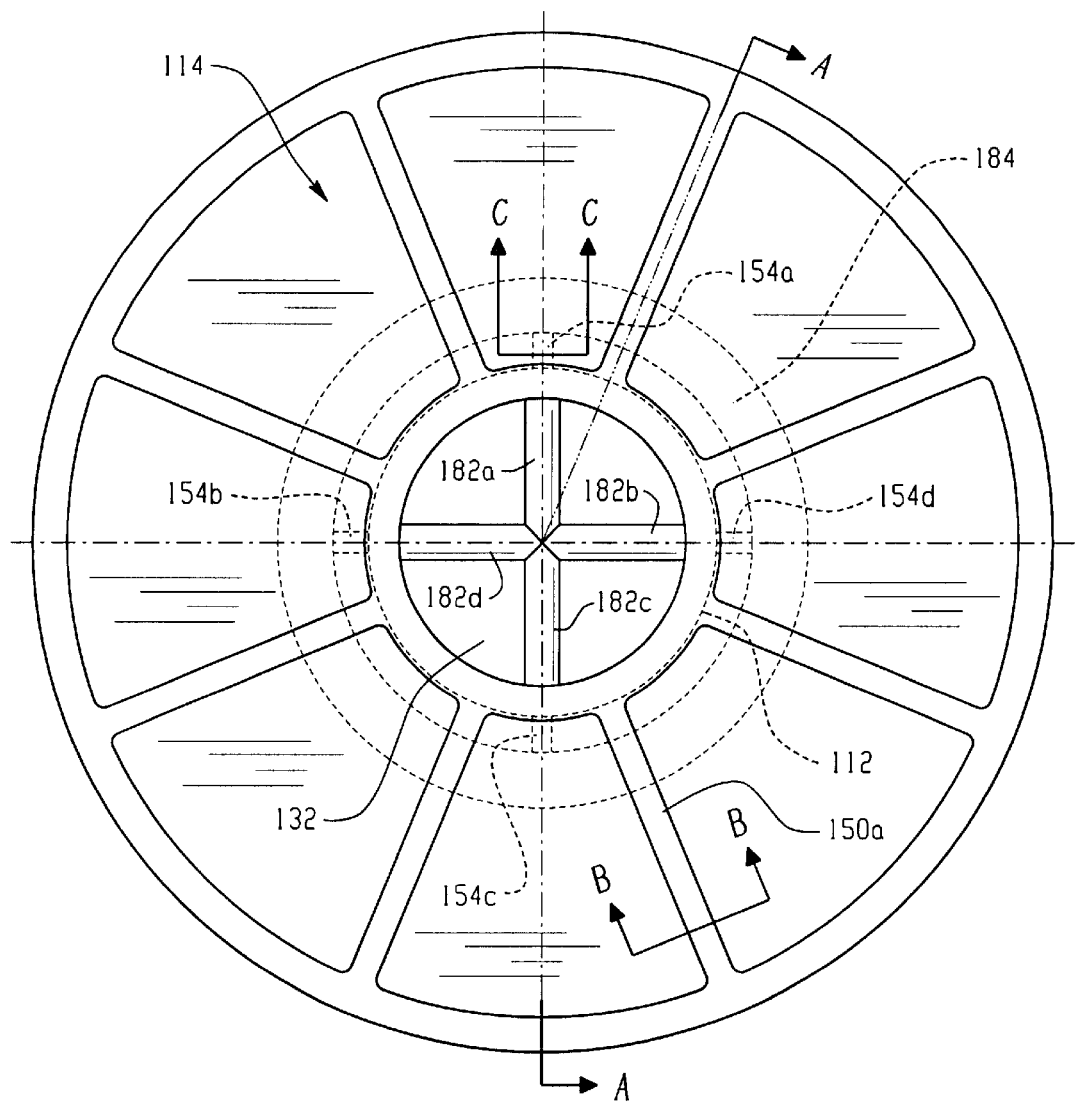
FIG. 3B is a rear elevational view of the thrust plug of FIG. 3A.
Figure 3D:
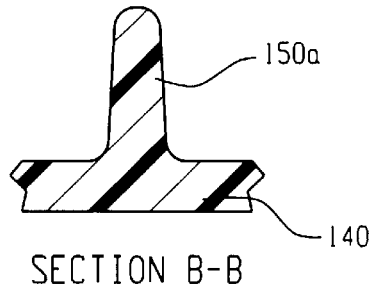
FIG. 3D is a sectional view of the thrust plug shown in FIG. 3B taken along the section line B—B in FIG. 3B.
Figure 3E:
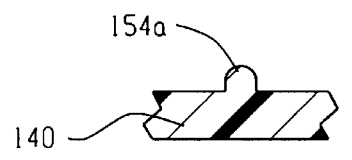
FIG. 3E is a sectional view of the thrust plug shown in FIG. 3B taken along the section line C—C in FIG. 3B.
Figure 4C:
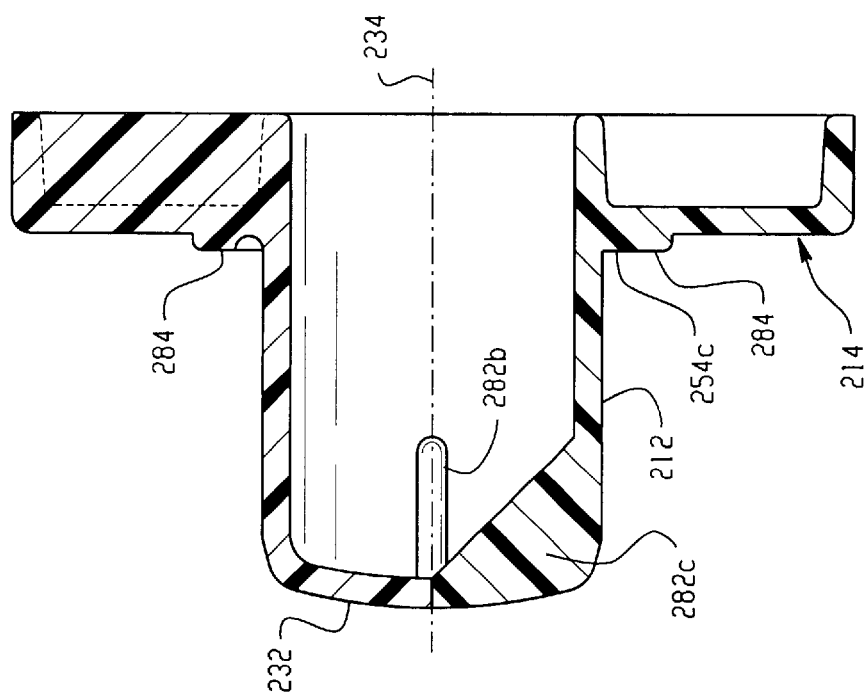
FIG. 4C is a sectional view of the thrust plug shown in FIG. 4B taken along the section line A—A in FIG. 4B.
Figure 4A:
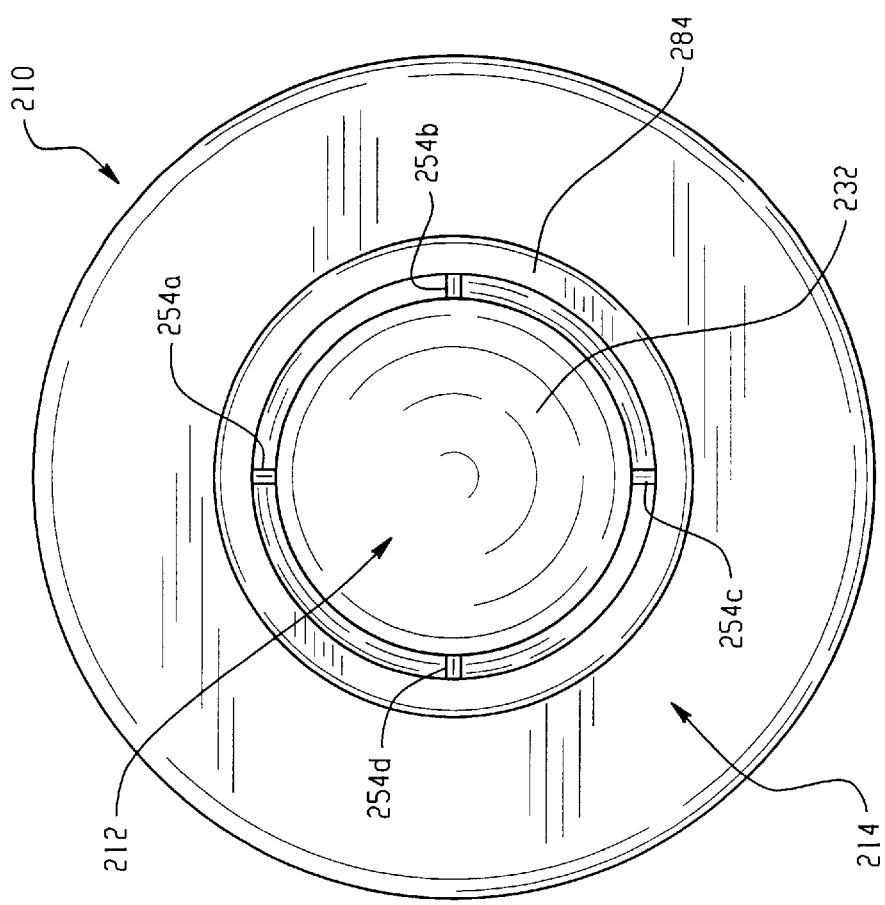
FIG. 4A is a front elevational view of a thrust plug according to a third embodiment of the present invention.
Figure 4B:
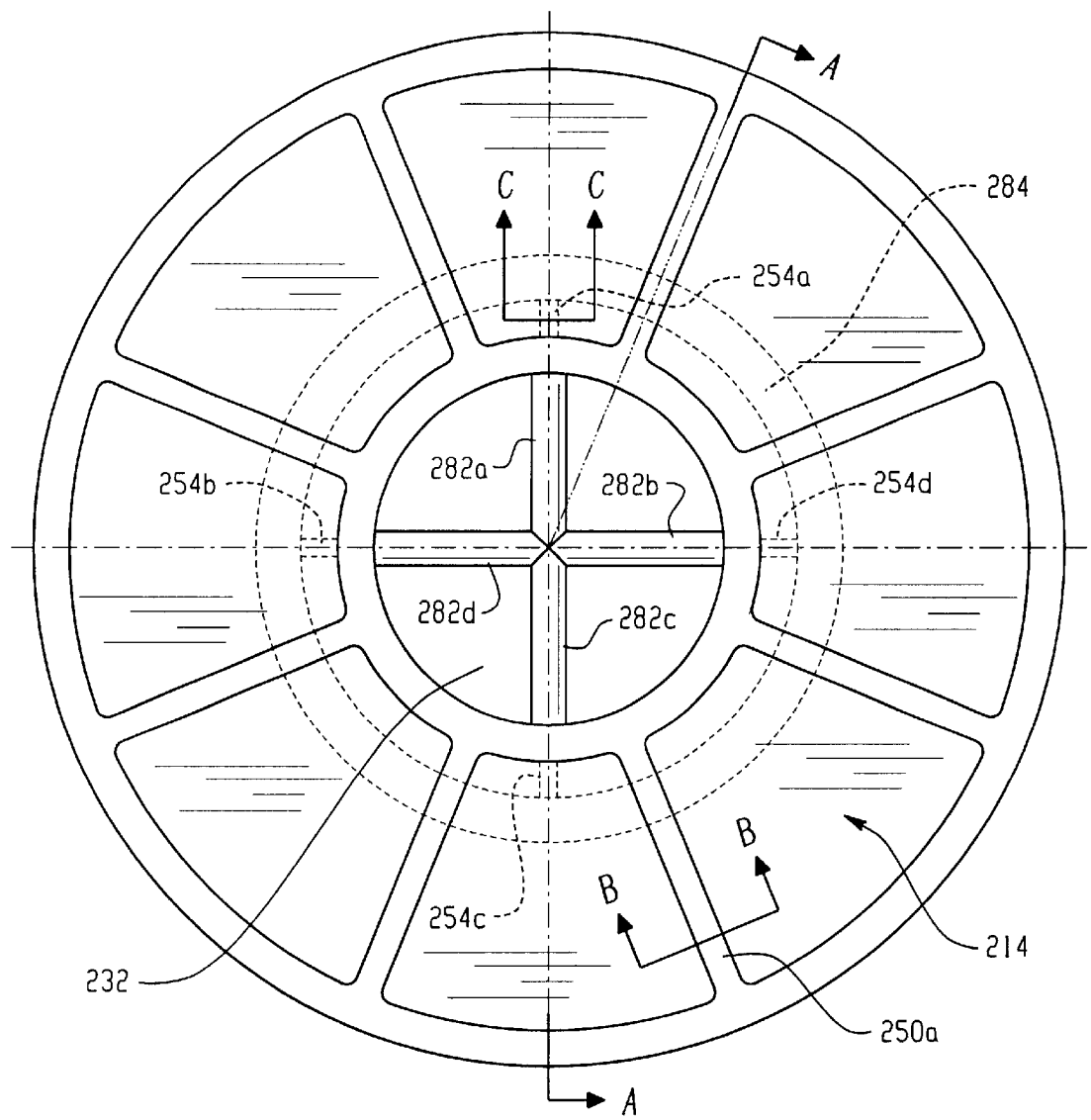
FIG. 4B is a rear elevational view of the thrust plug of FIG. 4A.
Figure 4D:
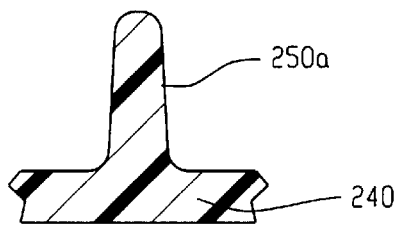
FIG. 4D is a sectional view of the thrust plug shown in FIG. 4B taken along the section line B—B in FIG. 4B.
Figure 4E:
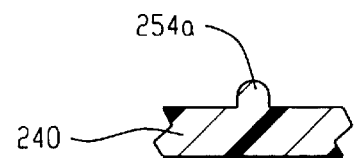
FIG. 4E is a sectional view of the thrust plug shown in FIG. 4B taken along the section line C—C in FIG. 4B.
Figure 5C:
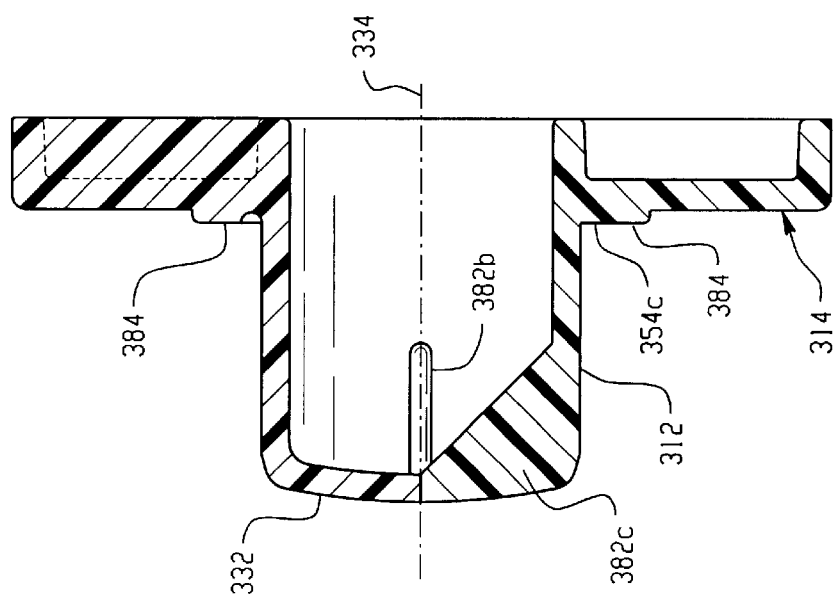
FIG. 5C is a sectional view of the thrust plug shown in FIG. 5B taken along the section line A—A in FIG. 5B.
Figure 5A:
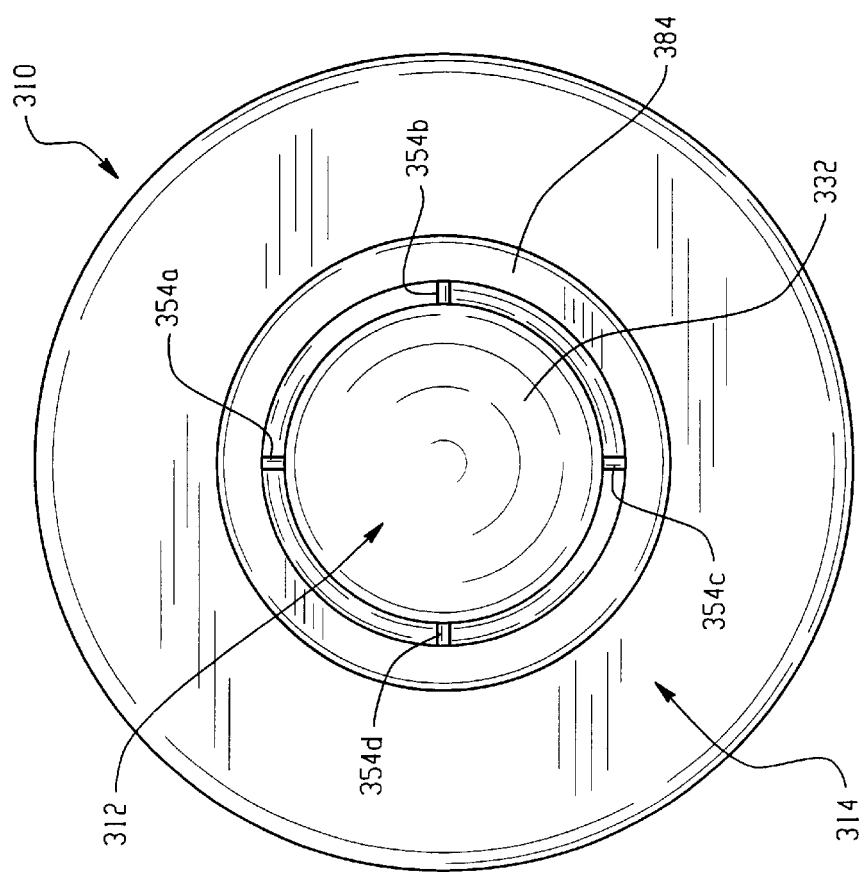
FIG. 5A is a front elevational view of a thrust plug according to a fourth embodiment of the present invention.
Figure 5B:
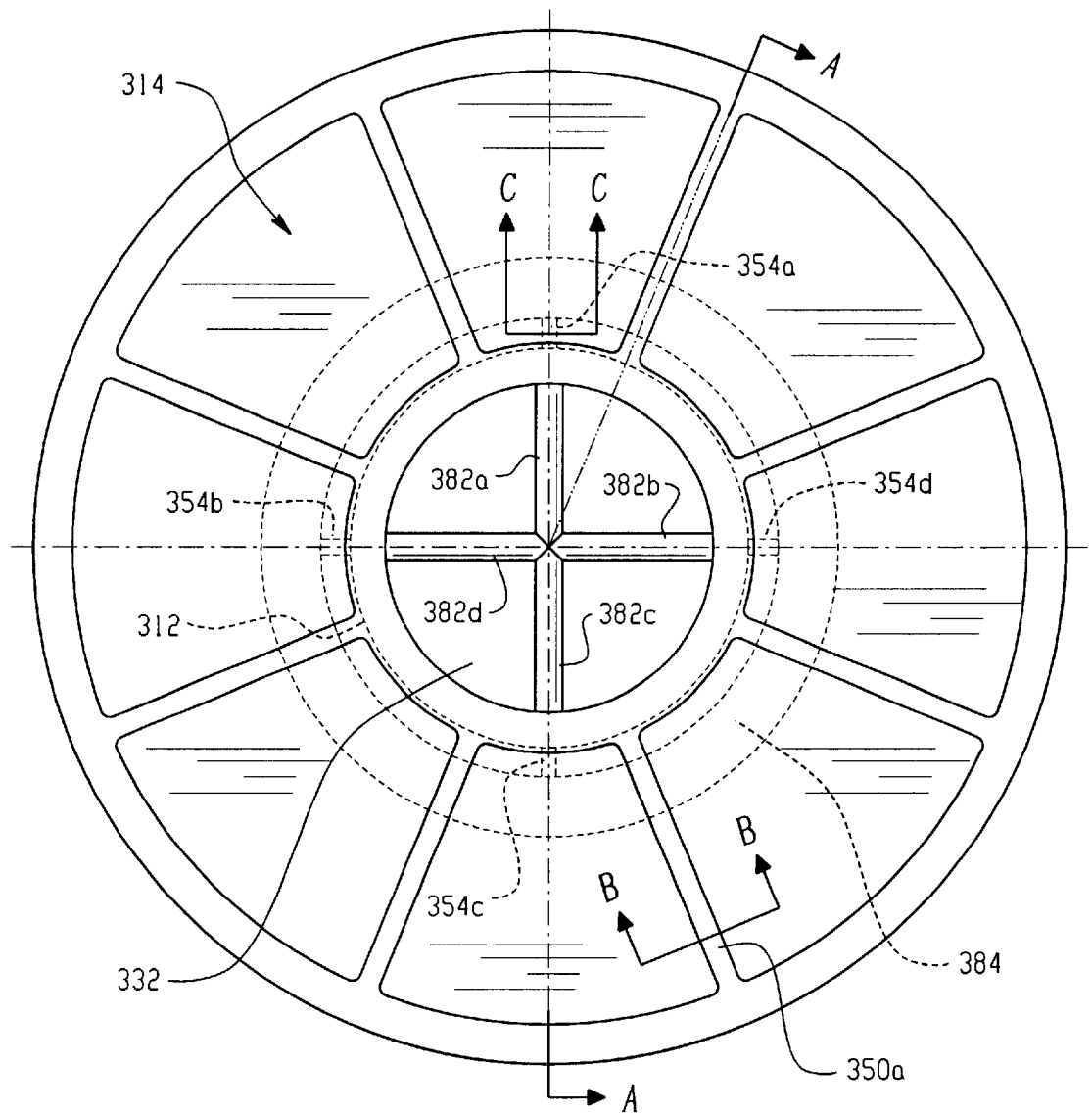
FIG. 5B is a rear elevational view of the thrust plug of FIG. 5A.
Figure 5D:
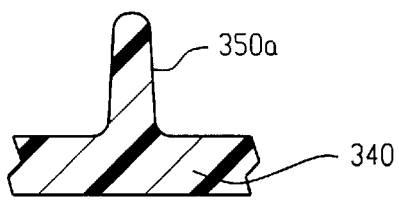
FIG. 5D is a sectional view of the thrust plug shown in FIG. 5B taken along the section line B—B in FIG. 5B.
Figure 5E:
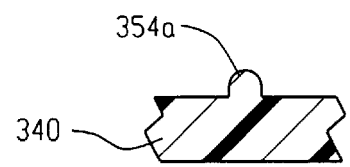
FIG. 5E is a sectional view of the thrust plug shown in FIG. 5B taken along the section line C—C in FIG. 5B.
Figure 6C:
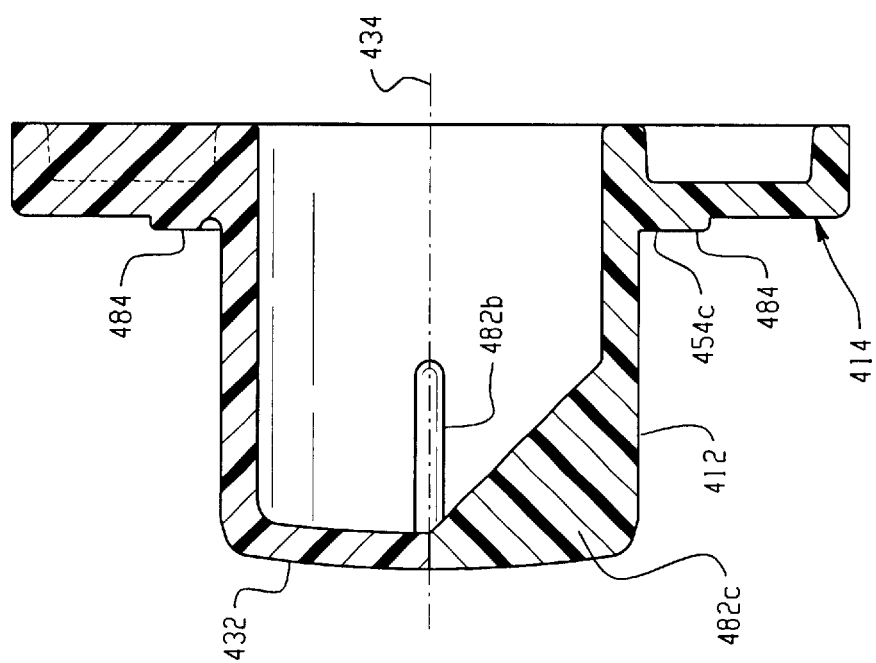
FIG. 6C is a sectional view of the thrust plug shown in FIG. 6B taken along the section line A—A in FIG. 6B.
Figure 6A:
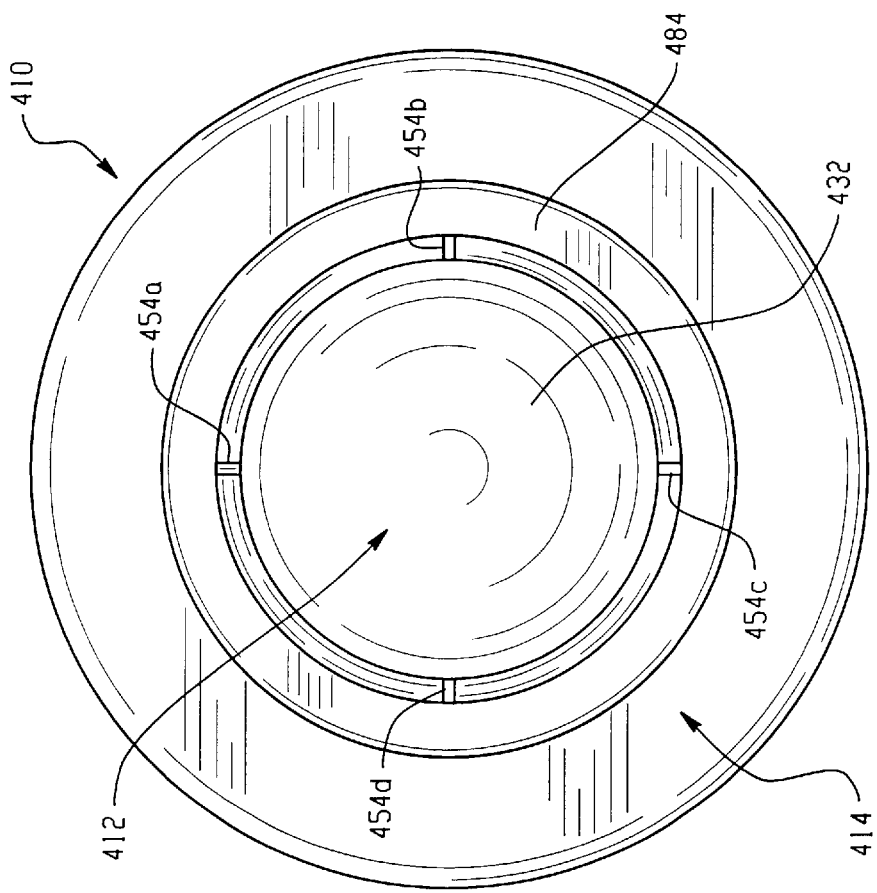
FIG. 6A is a front elevational view of a thrust plug according to a fifth embodiment of the present invention.
Figure 6B:
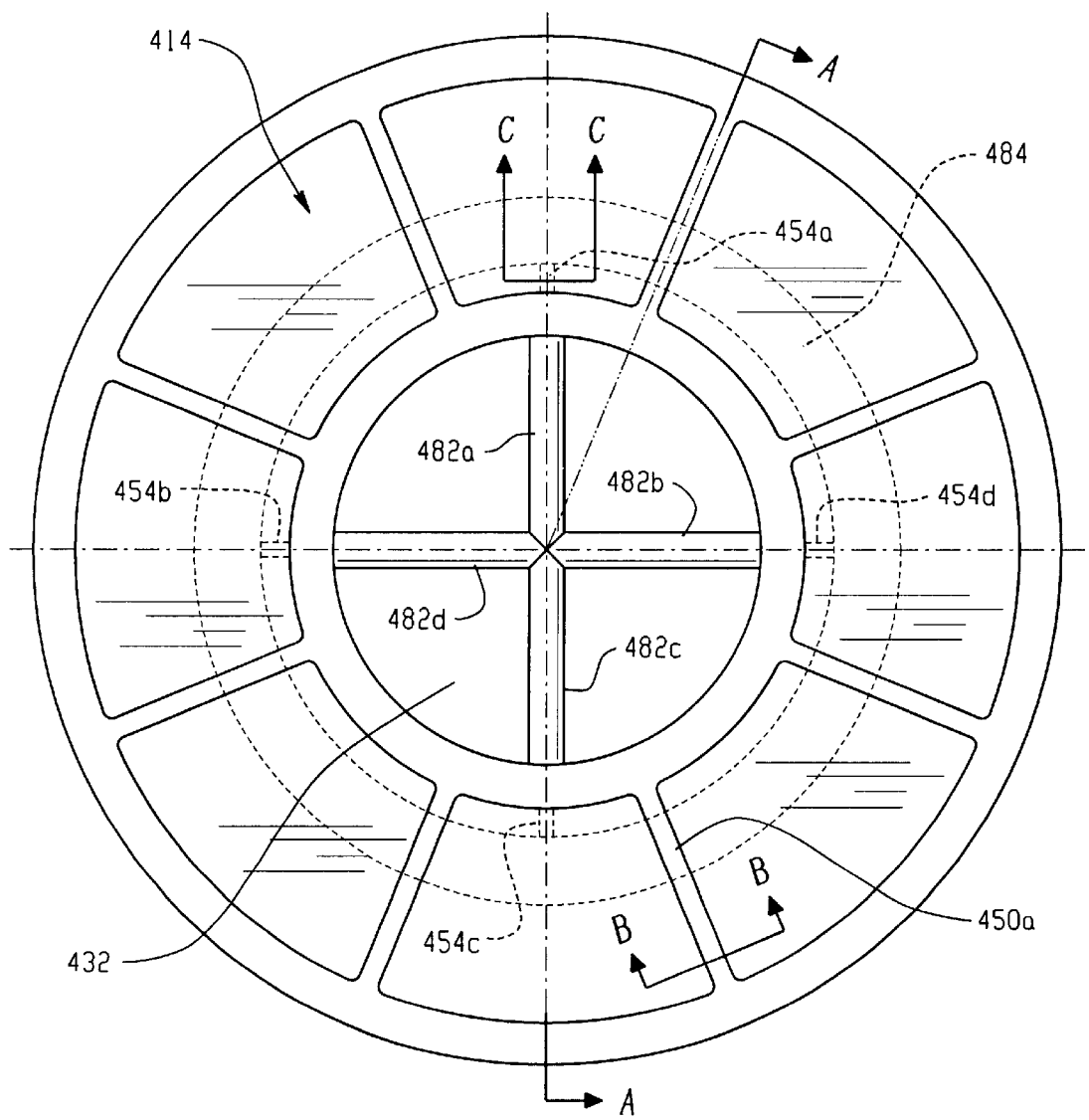
FIG. 6B is a rear elevational view of the thrust plug of FIG. 6A.
Figure 6D:
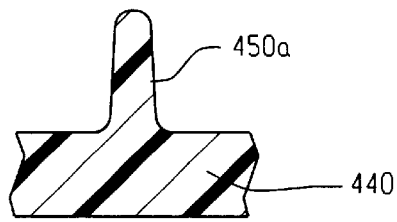
FIG. 6D is a sectional view of the thrust plug shown in FIG. 6B taken along the section line B—B in FIG. 6B.
Figure 6E:
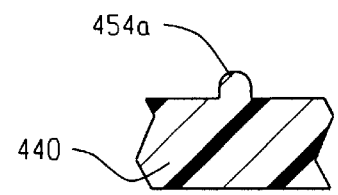
FIG. 6E is a sectional view of the thrust plug shown in FIG. 6B taken along the section line C—C in FIG. 6B.

FIG. 2 shows an illustration of an exemplary application of thrust plug 10 with an exemplary fitting, i.e., tapped coupling 60, e.g., a Lasco Fittings Inc. TAP'T COUPLING™ fitting. Of course the thrust plug 10 of the present invention can be used with virtually any fitting or pipe of the appropriate size having an opening that needs to be capped and thrust blocked (especially fittings sealed with gaskets or O-rings), e.g., a valve, a cross being used as an elbow, a dead end, etc. The specific tapped coupling 60 shown in FIG. 2 has two gasketed connections 62, 64 on its cylindrical run 66 and a ACME thread 68 on a branch 70. The gasketed connections 62, 64 each has an annular gasket 72, 74 held in place by an annular end cap 76, 78 that is held in place by welding or adhesive or ultrasonic welding or the like. The plug 10 and gaskets of the tapped coupling are preferably various iron pipe size (IPS) standard sizes. The tapped coupling 60 accepts a length of piping (not shown) in one gasketed connection 62 and the thrust plug 10 in the other gasketed connection 64. The tapped coupling also preferably has an internal pipe stop 79, which is a projection that prevents a pipe from being inserted into the tapped coupling 60 more than half of the way into the tapped coupling 60. The plug 12 of thrust plug 10 is inserted into the connection 64 and forced therein preferably until one or more of the standoffs 54a–54d contact the butt end of gasketed connection 64, as shown in FIG. 2. The plug 12 is sized so that in this position, the gasket 74 is compressed (as shown in FIG. 2) against plug 12 to provide adequate sealing so as to prevent leaks during the dramatic increases in pressure that accompany thrust forces.

With the fitting (i.e., tapped coupling 60), the length of piping (not shown), and the thrust plug 10 in this position, concrete is poured and allowed to cure on the rear side of the thrust plug 10 to form an appropriately sized thrust block 80, as shown in FIG. 2. Determining the size of a required thrust block can be done by those skilled in the art and depends on numerous factors, e.g., the working system pressure, the maximum system pressure, the size of piping in the system, the types and sizes of fittings in the system, the characteristics of the soil backing up the thrust block, etc. The thrust plug 10 of the present invention will typically not require anything to be inserted between the concrete and the base 14. The concrete may be poured directly against the base 14. In FIG. 2, the concrete of thrust block 80 is shown extending into and substantially filling the various volumes 30, 48, 54a–54h within the thrust plug 10.

As discussed above, the thrust plugs of the present invention are preferably used to reversibly plug a fitting or length of pipe or the like. A thrust plug according to the present invention can be removed by removing the thrust block 80 from behind the thrust plug 10, and then forcibly withdrawing the plug from the fitting, thereby breaking the seal formed by gasket 74 against the plug 12. The thrust plug 10 may then be discarded and a length of pipe inserted into the opening 64 to continue the fluid system beyond the location that was reversibly plugged by the thrust plug.

FIGS. 3A–3E show a second embodiment 110 of the thrust plug of the present invention suitable for use with 2" PVC piping with an operating fluid pressure of 315 p.s.i. using a thrust block that is 19 inches by 19 inches by 15–19 inches. FIGS. 4A–4E show a third embodiment 210 of the thrust plug of the present invention suitable for use with 2 ½" PVC piping with an operating fluid pressure of 315 p.s.i. using a thrust block that is 24 inches by 24 inches by 20–24 inches. FIGS. 5A–5E show a fourth embodiment 310 of the thrust plug of the present invention suitable for use with 3" PVC piping with an operating fluid pressure of 315 p.s.i. using a thrust block that is 27 inches by 27 inches by 23–27 inches. FIGS. 6A–6E show a fifth embodiment 410 of the thrust plug of the present invention suitable for use with 4" PVC piping with an operating fluid pressure of 315 p.s.i. using a thrust block that is 34 inches by 34 inches by 30–34 inches. These thrust plugs 110, 210, 310, and 410 have virtually all the structures of the thrust plug 10 shown in FIGS. 1A–1D and 2, and described in the accompanying text, with a few exceptions as set forth below. Accordingly, virtually all of the descriptions above with respect to the structure and use of thrust plug 10 applies to these other thrust plugs 110, 210, 310, and 410 as well. Accordingly, the prefixes 1-, 2-, 3-, and 4- will be used with the same reference characters used in FIGS. 1A–1D and 2 for corresponding structures in these other thrust plugs 110, 210, 310, 410. For clarity of the figures, however, not all the corresponding structures will be re-labeled with these prefixes in FIGS. 3A–3E, 4A–4E, 5A–5E, 6A–6E; only the references used below will be re-labeled.

Thrust plugs 110, 210, 310, 410 are different from one-another in that they have different dimensions and aspect ratios because they are directed toward different pipe diameters. Additionally, thrust plugs 110, 210, 310, 410 differ from thrust plug 10 in that thrust plugs 110, 210, 310, 410 have additional triangular gussets 182a–182d, 282a–282d, 382a–382d, 482a–482d that extend from the inside of their respective caps 132, 232, 332, 432 to the inside walls of their respective plugs 112, 212, 312, 412. In addition, thrust plugs 110, 210, 310, 410 differ from thrust plug 10 in that the standoffs in thrust plugs 110, 210, 310, 410 are different than in thrust plug 10. The standoffs 54a–54d of thrust plug 10 are essentially thin, squat gussets. Thrust plugs 110, 210, 310, 410 do have such standoffs 154a–154d, 254a–254d, 354a–354d, 454a–454d that are essentially squat gussets; however, in addition thereto, the standoffs in thrust plugs 110, 210, 310, 410 further include annular rings 184, 284, 384, 484 that extend from the plug side of bases 114, 214, 314, 414. The annular rings 184, 284, 384, 484 are preferably spaced from the base of the plug to prevent stress concentration and/or interference with the annular radii at the base of the plug.

Like all solid objects, thrust plugs 10, 110, 210, 310, 410 provide a projected area (the surface area of a plan view or an elevational view) when viewed along a line of sight. This is best seen in FIGS. 1A, 3A, 4A, 5A, and 6A (which are plan views viewed along a line of sight corresponding to the central axis 34), the plugs 12, 112, 212, 312, 412, when viewed along a line of sight corresponding to the central axis 34, provide a circular projected area. As shown in those same figures, the bases 14, 114, 214, 314, 414 each provide additional projected area for contact with the concrete thrust block in addition to the projected area provided by their respective plugs 12, 112, 212, 312, 412, such that the overall projected area of thrust plugs 10, 110, 210, 310, 410 is greater than (and preferably at least twice) the projected area of the respective plugs 12, 112, 212, 312, 412 when viewed along a common line of sight.

More specifically to the figures, plug 112 shown in FIGS. 3A–3E has a projected area (the surface area of a plan view or an elevational view) of about 4.4 square inches (it has a diameter of about 2.375 inches) when viewed along a line of sight corresponding to axis 134. The total projected area of the thrust plug 110 including the base 114 (including the projected area provided by the plug 112) is about 38.5 square inches (it has a diameter of about 7.00 inches) when viewed along a line of sight corresponding to axis 134. Thus, the base 114 provides an additional 34.1 square inches of projected area for contact with a thrust block than the plug 112 alone would provide and thus the thrust plug 110 provides more than eight (8.75) times as much projected area as the plug 112 alone would provide. Similarly, the plug 212 shown in FIGS. 4A–4E has a projected area of about 6.5 square inches (it has a diameter of about 2.875 inches) when viewed along a line of sight corresponding to axis 234. The total projected area of the thrust plug 210 including the base 214 (including the projected area provided by the plug 212) is about 38.5 square inches (it has a diameter of about 7.00 inches) when viewed along a line of sight corresponding to axis 234. Thus, the base 214 provides an additional 32.0 square inches of projected area for contact with a thrust block than the plug 212 alone would provide and thus the thrust plug 210 provides more than five (5.9) times as much projected area as the plug 212 alone would provide. Similarly, the plug 312 shown in FIGS. 5A–5E has a projected area of about 9.6 square inches (it has a diameter of about 3.500 inches) when viewed along a line of sight corresponding to axis 334. The total projected area of the thrust plug 310 including the base 314 (including the projected area provided by the plug 212) is about 63.6 square inches (it has a diameter of about 9.00 inches) when viewed along a line of sight corresponding to axis 334. Thus, the base 314 provides an additional 54 square inches of projected area for contact with a thrust block than the plug 312 alone would provide and thus the thrust plug 310 provides more than six (6.6) times as much projected area as the plug 312 alone would provide. Similarly, the plug 412 shown in FIGS. 6A–6E has a projected area of about 15.9 square inches (it has a diameter of about 4.50 inches) when viewed along a line of sight corresponding to axis 434. The total projected area of the thrust plug 410 including the base 414 (including the projected area provided by the plug 412) is about 63.6 square inches (it has a diameter of about 9.00 inches) when viewed along a line of sight corresponding to axis 434. Thus, the base 414 provides an additional 47.7 square inches of projected area for contact with a thrust block than the plug 412 alone would provide and thus the thrust plug 410 provides about four (4.0) times as much projected area as the plug 412 alone would provide.

The thrust plugs 110, 210, 310, 410 are used in the same manner as the thrust plug 10 (see FIG. 2 and accompanying text). While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, the cap 32 of thrust plug 10 need not be positioned at the second end 18 of plug 12. In the alternative, the cap 32 can be positioned virtually anywhere inside the volume 32 or the volume 48 or at the exposed end of central ring 46. As another example, the thrust plug need not have a male plug that is accepted into a female coupling, as shown in the figures. In the alternative, the thrust plug can be more of a thrust cap, having an ordinary female cap (with or without a gasket or an O-ring) with an opening that accepts, for example, a length of pipe, with the cap having affixed thereto (and preferably integrally formed therewith) a base, with or without one or more of the additional structures discussed above. Additionally, the base 14 need not be planar and, to the extent a particular base lies in or has portions lying in a hypothetical plane, that hypothetical plane need not be perpendicular to the axis of the plug. Other relationships between such a hypothetical plane and the axis might be acceptable or preferable (e.g., with a Y-fitting). Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A thrust plug, comprising:
   (a) a plug, said plug having a size and a shape for insertion into an opening in a fluid delivery system thereby plugging the opening, said plug having at least a first portion that is tapered and a cap portion, said first portion tapered so as to narrow toward said cap portion; and
   (b) a substantially planar base, affixed to and extending from said plug, said base having a surface against which a concrete thrust block can be cast; and
   (c) wherein said base is oriented with respect to said plug in such a manner that a concrete thrust block cast against said base will tend to resist said plug from being forced from the opening by pressurized fluid in the fluid delivery system; and
   (d) wherein said base further comprises an encompassing flange extending around a periphery of said base, extending from said base in a direction generally opposite to the direction that said plug extends from said base, and, along with said surface against which the concrete thrust block can be cast, defining a volume into which concrete can be cast, thereby providing lateral support for said base relative to the thrust block;
   (e) wherein said base further comprises a plurality of standoffs extending between said plug and said base to provide additional stand-off from said base; and
   (f) wherein said base further comprises an annular ring positioned so as to abut a structure defining the opening in the fluid delivery system; and
   (g) wherein said base further comprises a central ring formed as an extension of said plug; and
   (h) wherein said base further comprises a plurality of gussets extending between said encompassing flange and said central ring, and also connected to said surface against which the concrete thrust block can be cast, thereby dividing said volume into a plurality of smaller volumes.

2. A method of plugging and thrust blocking an opening in a fluid delivery system, comprising the steps of:
   (a) providing a thrust plug, having:
      i. a plug, said plug having a size and a shape for insertion into the opening in the fluid delivery system thereby plugging the opening; and
      ii. a base, affixed to and extending from said plug, said base having a surface against which a concrete thrust block can be cast; and
      iii. wherein said base is oriented with respect to said plug in such a manner that a concrete thrust block cast against said base will tend to resist said plug from being forced from the opening by pressurized fluid in the fluid delivery system;
   (b) inserting the plug of the thrust plug into the opening, thereby plugging the opening; and
   (c) casting a concrete thrust block against the surface of the base.

3. A method of plugging and thrust blocking an opening in a fluid delivery system according to claim 2 wherein said step (a) comprises the step of providing a thrust plug, having:
   (a) a plug, said plug having a size and a shape for insertion into an opening in a fluid delivery system thereby plugging the opening, said plug having at least a first portion that is tapered and a cap portion, said first portion tapered so as to narrow toward said cap portion; and (b) a substantially planar base, affixed to and extending from said plug, said base having a surface against which a concrete thrust block can be cast; and (c) wherein said base is oriented with respect to said plug in such a manner that a concrete thrust block cast against said base will tend to resist said plug from being forced from the opening by pressurized fluid in the fluid delivery system; and (d) wherein said base further comprises an encompassing flange extending around a periphery of said base, extending from said base in a direction generally opposite to the direction that said plug extends from said base, and, along with said surface against which the concrete thrust block can be cast, defining a volume into which concrete can be cast, thereby providing lateral support for said base relative to the thrust block.

4. A method of plugging and thrust blocking an opening in a fluid delivery system according to claim 2 wherein the opening is an opening in a fitting and further wherein said step (b) comprises the step of inserting the plug of the thrust plug into the opening in the fitting, thereby plugging the opening.

5. A method of plugging and thrust blocking an opening in a fluid delivery system according to claim 2 wherein the opening is an opening in a pipe and further wherein said step (b) comprises the step of inserting the plug of the thrust plug into the opening in the pipe, thereby plugging the opening.

* * * * *